June 3, 1930.  R. G. MANIFOLD  1,760,951
ROTARY GATE VALVE
Filed Oct. 4, 1927  2 Sheets-Sheet 1
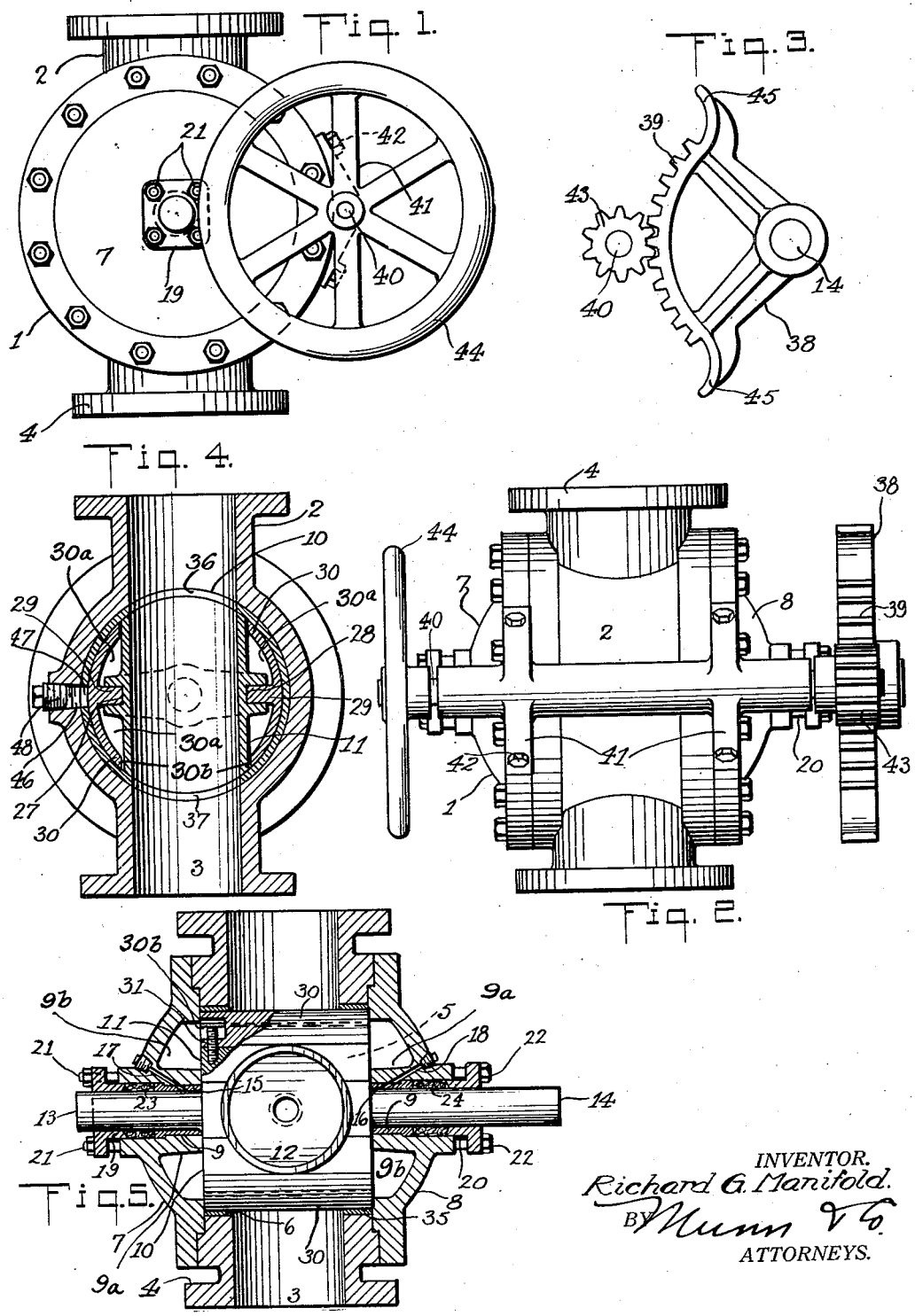
INVENTOR.
Richard G. Manifold.
BY Nunn & Co.
ATTORNEYS.

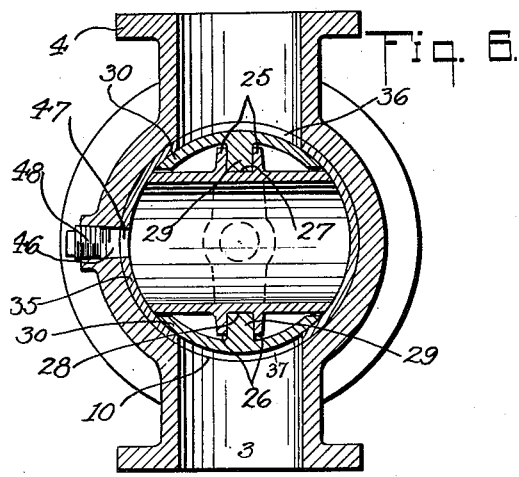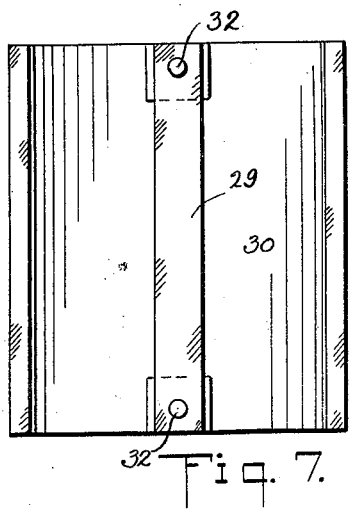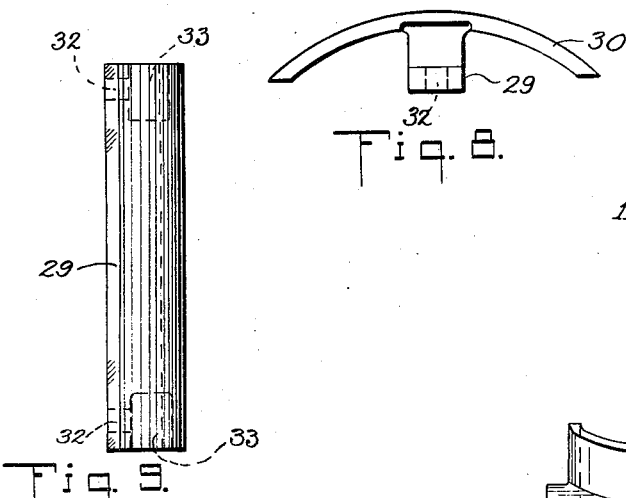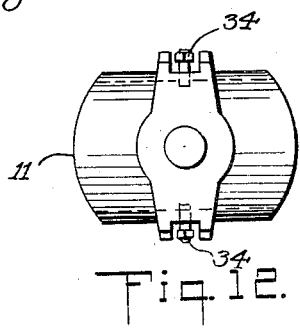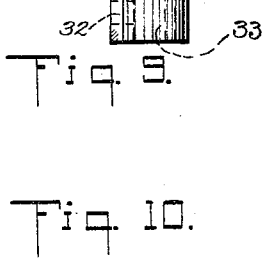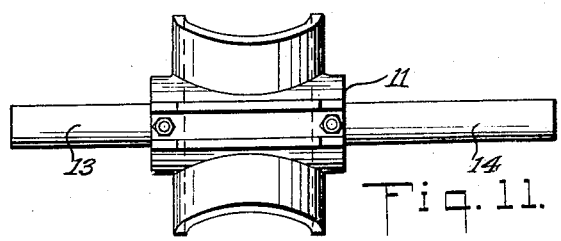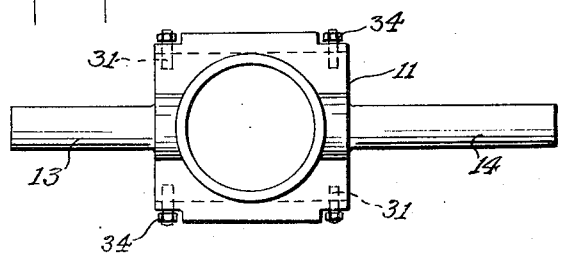

Patented June 3, 1930

1,760,951

UNITED STATES PATENT OFFICE

RICHARD G. MANIFOLD, OF LOS ANGELES, CALIFORNIA, ASSIGNOR TO THE FRONTIER DEVELOPMENT COMPANY, OF LOS ANGELES, CALIFORNIA, A CORPORATION OF NEVADA

ROTARY GATE VALVE

Application filed October 4, 1927. Serial No. 223,991.

My invention relates to valves, and it refers particularly to a gate-valve, in which gates or shoes are mounted on a rotatable element so as to form a tight seal when the valve is closed.

One object of the invention is to construct a valve of this character so that, when the valve is open, a fluid may flow therethrough without being obstructed and without being liable to form eddies therein, as is usual in gate-valves heretofore known in the art.

Another object of the invention is to construct a valve of this character so that, when the valve is used for leading such liquids therethrough as are liable to leave scale deposits on the walls of their conduits, the formation of the scale deposits is minimized.

A further object of the invention is to construct a valve of this character so that, if it is necessary to insert a tool through the valve in its open position, as, for instance, when the valve is used at the top of a well during drilling operations, the tool is prevented from damaging the valve seat or the valve member in engagement therewith, and thus the life of the valve is considerably prolonged.

A still further object of the invention is to construct a valve of this character so that a certain quantity of the fluid led to the valve will be entrapped between the rotatable valve element and the shoes thereon, thus causing the shoes to be in a uniformly cushioned engagement with the valve seat and thereby not only assuring a perfect fit of the shoes upon the valve seat in all positions of the rotatable element, but also avoiding any liability of the shoes to engage the valve seat with an excessive pressure, by which the valve seat may be damaged, and, incidentally, thereby also assuring the usefulness of the valve for a maximum length of time.

With the above-mentioned objects and with other objects in view, the invention consists in the novel construction and combination of parts hereinafter described, illustrated in the accompanying drawings, and set forth in the appended claims, it being understood that various changes in the form, proportion, size and minor details of construction within the scope of the claims may be resorted to without departing from the spirit, or without sacrificing any of the advantages, of the invention.

In the drawings:

Fig. 1 is a top plan of a preferred embodiment of my invention;

Fig. 2 is a side elevation of the valve;

Fig. 3 is a plan of the gearing means employed in the preferred embodiment for rotating the valve member in the valve;

Fig. 4 is a mid-sectional plan of the valve, with the valve member therein turned to its open position;

Fig. 5 is a mid-sectional elevation of the valve, at right angles to that illustrated in Fig. 4 and showing the valve member in its closed position;

Fig. 6 is a mid-sectional plan of the valve, similar to Fig. 4, with the valve member turned to its closed position;

Fig. 7 is an enlarged side elevation of one of the shoes in the valve member;

Fig. 8 is an end elevation of one of the shoes, as viewed from the top in Fig. 7;

Fig. 9 is an elevation of one of the shoes, as viewed from the right in Fig. 7;

Fig. 10 is an elevation of the rotatable element of the valve member, the view showing the nut-and-bolt means for securing the shoes of the valve member to the element during the machining process of the valve member;

Fig. 11 is an elevation of the rotatable element of the valve member, as viewed from the top in Fig. 10; and Fig. 12 is a view of the rotatable element of the valve member, as seen from the right in Figs. 10 and 11.

The valve of my invention is in the drawings indicated as a whole by the numeral 1. This valve comprises a valve body 2, which has therein a longitudinal opening 3, preferably of a cylindrical form, and at the ends of the opening the valve body may be respectively provided with the usual flanges 4 for connecting the valve 1 with a suitable conduit. Transversely of the opening 3, the valve body 2 has therein another opening 5, which is preferably bounded by a cylindrical wall forming a valve seat 6. On the valve body and at one end of the opening 5 is a head 7, and at the other end of the opening is another head 8. Although preferably both of the heads 7 and 8 are removably secured to the valve body by any suitable means, one of the heads, if so desired, may be integral with the valve body. In each of the heads 7 and 8 is a bore 9, which, when the head is in its place on the valve body, is in axial alignment with the opening 5 therein. This bore also extends through a hub $9^a$, which is formed centrally on the inside of each head, and the heads are otherwise shaped on their inner sides so that in each of them an annular space $9^b$ is provided around the respective hub, as shown in Fig. 5.

A valve member 10 is so constructed and mounted as to rotate within the opening 5 of the valve body and to allow a fluid to flow through the valve body without being obstructed. For this purpose the valve member comprises an element 11, which has therethrough an opening 12, preferably of the same diameter as the opening 3 and adapted to register therewith, and the element has on its outside integral therewith shafts 13 and 14, which are arranged in alignment with each other on opposite sides of the opening 12. These shafts are journaled in respective bearings 15 and 16, fixed at the inner ends of the bores 9 in the heads 7 and 8, lubricating passages 17 and 18 leading respectively through the heads and the bearings to the shafts, and respective glands 19 and 20, secured in adjustable relation to the heads in any suitable manner, as by respective nut-and-bolt means 21 and 22, serve to compress respective packings 23 and 24 for preventing leakage of lubricant or other fluid around the shafts.

On its outside the element 11 is also provided with pairs of ribs 25 and 26, which thus form respective channels 27 and 28, virtually parallel with the shafts 13 and 14 on opposite sides of the opening 12. Each of these channels is adapted to receive therein a rib 29, formed on the inside of each of two shoes 30, which preferably are of a cylindrical curvature both on their inside and their outside, so that a space $30^a$ is formed between the element 11 and each shoe 30 and at each side of the rib 29 thereon, when the shoes are placed with their ribs in the respective channels 27 and 28. The arrangement of the shoes and the ribs is also such that openings $30^b$ are respectively formed between the elements and the side edges of the shoes in order to allow fluid to pass through these openings into the spaces $30^a$ and the spaces $9^b$ in the respective heads 7 and 8. The shoes 30 are concentric with the shafts 13 and 14, the element 11 being at the ends of the opening 12 of a curvature corresponding with that of the outside of each shoe 30 and also concentric with the shafts 13 and 14, and the shoes together with the element thus forming the complete valve member 10.

Into the element are preferably secured bolts 31, and each shoe is preferably formed with holes 32 for passing the respective bolt therethrough, while recesses 33 are also formed in the shoes for receiving therein respective nuts 34, so that, when the nuts are screwed home, the shoes may be firmly secured to the element and thus the valve member may be easily machined to its required size and shape. After the machining process of the valve member it is preferable that the shoes are slidably secured to the element. As suggested in Fig. 5, the nuts 34 are therefore removed from the bolts 31, thus allowing the shoes to move freely in the direction of the valve seat and thereby effecting a better seal of the valve member in the valve body.

While the valve member may be made so that it fits snugly on the valve seat 6 in the valve body, it is preferably somewhat smaller in diameter than the valve opening 5, and a packing lining 35, which has therein openings 36 and 37 that register with the opening 3 in the valve body and with the opening 12 in the element 11 when the valve member is in its open position, is interposed between the valve member and the valve seat. By this construction leakage of fluid around the valve member is prevented, and the valve member is at the same time allowed to be turned smoothly to its open and closed positions within the valve body.

The valve member is fitted between the heads 7 and 8 so that it has only a sufficient end play for allowing the free rotation of the valve member within the valve body, and any suitable means may be employed for effecting the rotation of the valve member. For instance, either of the shafts 13 and 14 may extend far enough outside of the respective gland therefor in order to allow an operating lever, not shown, to be secured directly to the shaft. Preferably, however, in order to adapt the valve 1 for use in connection with steam conduits, or in connection with conduits arranged for other fluids to flow therethrough under high pressure, or to make the valve of such a dimension that it may be connected in a conduit of a large diameter, one of the shafts 13 or 14 may have at one end secured thereon a fragmental wheel 38, provided at its periphery with a gear segment 39, and a shaft 40, in parallelism with the shafts 13 and 14, is rotatably mounted upon the valve body in any suitable manner, as, for example, in brackets 41, secured by nut-and-bolt means 42 to the valve body. The shaft 40 has at one end fixed thereon a pinion 43 which meshes with the gear segment of the fragmental wheel, and has at its other end fixed thereon a hand wheel 44, and preferably the fragmental wheel 38 has at the ends of the gear segment 39 outward curved extensions 45, by which the pinion 43 may be stopped in its rotative movement at the ends of the gear segment, so that the fragmental wheel is rotatable only in an arc of 90° and that the valve member thereby with certainty may be rotated to its fully open position, when its opening 12 is in a true registering position relative to the opening 3 in the valve body, as shown in Fig. 4, or to its fully closed position, when the axis of its opening 12 is exactly at right angles to the axis of the opening 3 in the valve body, as shown in Figs. 5 and 6.

I preferably also provide the valve body with a by-pass open 46, which leads through the valve body from the opening 5, and the packing lining 35 is in such a case provided with an opening 47 adapted to register with the by-pass opening. A plug 48 may be screwed into the by-pass opening when the use of a by-pass is not desired.

It should be observed that by the construction of a gate-valve 1, as described in the foregoing, the shoes 30 effectively prevent the passage of a fluid through the valve, when the valve member 10 is in its closed position, and that, when the valve member is turned to its open position, the passage of the fluid through the valve is unobstructed so that the formation of eddies in the valve is effectively prevented. It is also evident that, whenever the element 11 is turned sufficiently for causing any of the openings 30$^b$ to communicate with the opening 3 in the valve body 2, a quantity of fluid will pass from the opening 3 restrictedly through the openings 30$^b$ into the spaces 30$^a$ and 9$^b$ and will be entrapped in these spaces so that the fluid pressure therein will be much less than the fluid pressure in the opening 3 and that, consequently, the shoes will be caused to come into a cushioned engagement with the seat portion in the valve body 2. The pressure on the fluid entrapped between the shoes 30 and the element 11 in the valve member 10 will remain virtually uniform, since, even if the entrapped fluid could leak from the spaces 30$^a$ and 9$^b$ when the valve member has been in a valve-closing position for a long time, a quantity of fluid equal to the quantity of the escaped fluid would enter through the leaking portion of the valve member into these spaces and would thus restore the previously existing pressure so as to effectively prevent any leakage of fluid through the valve 1.

I claim as my invention:

In a valve of the character described, a valve body having an opening therein for allowing the flow of a fluid through the valve body, and a second opening transversely of the first-mentioned opening, the second opening being bounded by a virtually cylindrical wall which forms a valve seat in the valve body; a head secured to the valve body at each end of the second opening, each head being on its inner side centrally provided with a hub so that an annular space is formed around the hub in the head, and each head having therein a bore which is virtually concentric with the valve seat and also extends through the hub; a valve member comprising an element which has at each end a shaft journaled in the bore of the respective head; pairs of ribs provided on the element so that a channel is formed between the ribs of each pair and that the channels are virtually diametrically opposite to each other and virtually parallel with the shafts; and a shoe on each side of the element, the shoe being provided with a rib, which fits slidably in the respective channel, so that the shoes are rotatable with the element and are adapted to engage the valve seat, each shoe being formed so that it fits the valve seat and so that a space, communicating with the annular space of the respective head, is formed on each side of the pair of ribs and that thereby, when the valve member is turned to or from its open position, a quantity of the fluid is allowed to enter, and to be entrapped in, the spaces in order to effect a uniformly cushioned engagement of the shoes with the valve seat.

RICHARD G. MANIFOLD.